(12) United States Patent
Chen et al.

(10) Patent No.: US 9,025,102 B2
(45) Date of Patent: May 5, 2015

(54) DRIVE CIRCUIT OF LIQUID CRYSTAL PANEL

(71) Applicant: Shenzhen China Star Optoelectronics Technology Co., Ltd., Shenzhen, Guangdong (CN)

(72) Inventors: Yinhung Chen, Shenzhen (CN); Xia Tian, Shenzhen (CN); Pei Jia, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 182 days.

(21) Appl. No.: 13/805,658

(22) PCT Filed: Nov. 6, 2012

(86) PCT No.: PCT/CN2012/084107
§ 371 (c)(1),
(2) Date: Dec. 19, 2012

(87) PCT Pub. No.: WO2014/063386
PCT Pub. Date: May 1, 2014

(65) Prior Publication Data
US 2014/0111721 A1    Apr. 24, 2014

(30) Foreign Application Priority Data

Oct. 22, 2012   (CN) .......................... 2012 1 0404855

(51) Int. Cl.
*G02F 1/1362* (2006.01)
*G02F 1/1368* (2006.01)
*G09G 3/36* (2006.01)

(52) U.S. Cl.
CPC ........ *G02F 1/1368* (2013.01); *G02F 1/136213* (2013.01); *G09G 3/3648* (2013.01); *G09G 2300/0876* (2013.01); *G09G 2320/0223* (2013.01)

(58) Field of Classification Search
CPC ............ G02F 1/1368; G02F 1/136213; G02F 1/13306; G02F 1/133; G02F 1/1362; G02F 2001/13606; H01L 27/1214; H01L 27/13

USPC ..................... 345/87–92, 204–215, 690–693; 349/19–43

See application file for complete search history.

(56) References Cited

U.S. PATENT DOCUMENTS 5,369,512 A * 11/1994 Yanai et al. ..................... 349/38
7,250,992 B2 * 7/2007 Lai .................................. 349/54
2003/0098934 A1   5/2003 Lee et al.
(Continued)

FOREIGN PATENT DOCUMENTS

CN    101552270 A    10/2009
CN    101866918 A    10/2010
(Continued)

*Primary Examiner* — Alexander Eisen
*Assistant Examiner* — Abhishek Sarma
(74) *Attorney, Agent, or Firm* — Andrew C. Cheng

(57) ABSTRACT

The present invention provides a drive circuit of liquid crystal panel, which includes a gate driver, a source driver, a plurality of gate lines, and a plurality of data lines. The plurality of gate lines and data lines define a plurality of pixel units. Each of the pixel units includes a thin-film transistor, a common electrode, a pixel electrode electrically connected to the thin-film transistor, and a correction capacitor. The thin-film transistor is electrically connected to the gate driver and the source driver respectively by means of the gate lines and the data lines. The common electrode and the pixel electrode constitute a liquid crystal capacitor. The thin-film transistor includes a gate terminal and a drain terminal. The correction capacitor is electrically connected between the gate terminal and the drain terminal for correcting a parasitic capacitor generated between the gate terminal ad the drain terminal due to structural characteristics.

7 Claims, 6 Drawing Sheets

(56) References Cited

U.S. PATENT DOCUMENTS

2008/0111934 A1* 5/2008 Wu et al. ............. 349/38
2010/0259699 A1* 10/2010 Yen et al. ............ 349/38
2011/0273654 A1* 11/2011 Wang et al. ........... 349/143
2012/0281168 A1* 11/2012 Shimoshikiryoh et al. ..... 349/78

FOREIGN PATENT DOCUMENTS

| | | |
|---|---|---|
| CN | 102254917 A | 11/2011 |
| CN | 102608815 A | 7/2012 |
| JP | 2001005037 A | 1/2001 |
| TW | 594347 B | 6/2004 |

* cited by examiner

DRIVE CIRCUIT OF LIQUID CRYSTAL PANEL

BACKGROUND OF THE INVENTION

1. Field of the Invention

The present invention relates to the field of liquid crystal display device, and in particular to a drive circuit of liquid crystal panel.

2. The Related Arts

The progress of science and technology and the improvement of living quality of human beings makes liquid crystal display devices widely used everywhere in daily living. People are now asking for more for the liquid crystal display devices and start demanding large display screen and fast response. However, increasing the size of the liquid crystal panel brings more complicated wire lay-out. Also, precise control pixel electrodes are getting more difficult due to wiring delay caused by the increase of number of pixel electrodes driven by a TFT (Thin-Film Transistor) substrate and feedback caused by the existence of TFT parasitic capacitor.

FIG. 1 is a schematic view showing the structure of a basic drive circuit of TFT array substrate. In the drawing, pixel electrodes are shown distributed in the entire TFT substrate and each pixel electrode is connected to a drain terminal D of at least one TFT. The source terminal S of each TFT is connected to at least one data line and a plurality data lines collectively constitutes a data bus structure. The gate terminal G of each TFT is connected to at least one gate line and a plurality of gate lines collectively constitutes a gate bus structure. The data bus structure and the gate bus structure collectively control data writing of the pixel electrode. In the substrate shown in the drawing, the pixel electrode P(i,j) of the ith column and jth row is commonly controlled by the gate line G(j) and data line S(i). When a writing operation is performed on the pixel electrode, the gate line G(j) is set at a high level to set the thin-film transistor T(I,j) in a conducting state. Under this condition, the magnitude of the drive voltage applied through the data line S(i) causes the liquid crystal molecules neighboring a site opposing the pixel electrode P(I,j) to rotate according to predetermined rotation direction so as to achieve displaying of image. Such a writing operation is performed in row-wise manner, so that when the gate line G(j) is in the high level, all the pixel electrodes of the jth row can perform a writing operation.

However, with the increase of the numbers of rows and columns of the pixel electrodes distributed in a matrix form on a TFT substrate, the lengthened gate lines and data lines cause time delay in the drive circuit. On the other hand, the parasitic capacitor $C_{gd}$ existing between the gate terminal G and the drain terminal D of a thin-film transistor affects the gate voltage Vg controlling conduction and cutoff of the thin-film transistor, especially for the neighboring site of the pixel electrode P(n,j) that is located at a distal end away from the data bus circuit, where due to the influence of negative feedback voltage caused by the parasitic capacitors $C_{gd}$ of the previous (n−1) thin-film transistors that the gate signal passed first and circuit delay, this site may have an extended response time and also suffers decay of gate voltage caused by the negative feedback, possibly making the thin-film transistor T(n,j) not conducting on, or not conducting on or not completely conducting on within a fixed time period when a source drive voltage $V_s(n,j)$ is applied to drive the liquid crystal molecules to rotate. This makes the liquid crystal molecules of the pixel electrode not rotating or not rotating in the predetermined direction, thereby causing change of transmittance and variation of contrast around the site and thus affecting the quality of displaying.

FIG. 2 is a schematic view showing connection of drive circuit of each pixel electrode, wherein the ith data line S(i) is connected to the source terminal S of the thin-film transistor T(i,j) at the ith column and jth row. The jth gate line G(j) is connected to the gate terminal G of the thin-film transistor T(i,j) at the ith column and jth row. The drain terminal D of the thin-film transistor T(i,j) at the ith column and jth row is connected to the pixel electrode P(I,j) at the ith column and jth row. The symbol $C_{gd}$ indicates the parasitic capacitor between the gate terminal G and the drain terminal D. The parasitic capacitor $C_{gd}$ is inherent to the characteristics of the thin-film transistors. The symbol $C_{lc}$ indicates a liquid crystal capacitor between the TFT substrate and a CF substrate, $C_s$ is a compensation capacitor between the TFT substrate and Vcom terminal and the compensation capacitor is provided for compensating for voltage drop of $C_{lc}$ through electrical discharging in order to properly extend the retention time for direction change of liquid crystal molecules in the area of $C_{lc}$.

FIG. 3 shows waveform of drive voltage for the thin-film transistor shown in FIG. 1, wherein VG(j) is an idea waveform on the jth row supplied by the gate bus, $V_g(N,j)$ is the waveform that has passed through the parasitic capacitors Cgd of the previous (N−1) thin-film transistors and circuit delay, and $V_{gh}$ and $V_{gi}$ are respectively high voltage and low voltage of $V_g(N,j)$. When voltage is greater than the conduction threshold voltage VT of the thin-film transistor, the thin-film transistor is conducted on and the drive voltage $V_g(N,j)$ on the data line S(N) performs a writing operation on the pixel electrode by driving the liquid crystal molecules neighboring the pixel electrode to rotate. When the gate voltage $V_g(N,j)$ is greater than the conduction voltage of the thin-film transistor, charging is effected on $C_{lc}$, $C_s$, $C_{gd}$ through the rising edge of $V_g(N,j)$ to achieve charging saturation and discharging in reverse direction is effected on the $C_s$ and $C_{gd}$ through the falling edge of $V_g(N,j)$ to achieve linear voltage dropping. Especially, during the reverse discharging process of $C_s$ and $C_{gd}$ caused by the falling edge of $V_g(N,j)$, delay of time may result. The curves show that the time period when the voltage stays greater than VT is extended. In other words, the thin-film transistor that is supposed to cut off is affected by the parasitic capacitor to maintain conducting. Such an influence is shown as voltage drift of $V_d(N,j)$ at the drain terminal D, which expands the time period when the liquid crystal molecules stay in a rotated state, and what is shown in that the liquid crystal molecules that are supposed not to rotate are now rotated, leading to abnormality of displaying contrast.

SUMMARY OF THE INVENTION

An object of the present invention is to provide a drive circuit of liquid crystal panel, which reduces the influence caused by time delay induced by parasitic capacitors and improves quality of large-sized liquid crystal display device.

To achieve the object, the present invention provides a drive circuit of liquid crystal panel, which comprises a gate driver, a source driver, a plurality of gate lines, and a plurality of data lines. The plurality of gate lines and data lines define a plurality of pixel units. Each of the pixel units comprises a thin-film transistor, a common electrode, a pixel electrode electrically connected to the thin-film transistor, and a correction capacitor. The thin-film transistor is electrically connected to the gate driver and the source driver respectively by means of the gate lines and the data lines. The common electrode and the pixel electrode constitute a liquid crystal capacitor. The thin-film transistor comprises a gate terminal and a drain terminal. The correction capacitor is electrically connected between the gate terminal and the drain terminal for correcting a parasitic capacitor generated between the gate terminal ad the drain terminal due to structural characteristics.

The thin-film transistor comprises a source terminal. The source terminal is electrically connected via the data lines to the source driver.

The gate terminal of the thin-film transistor is electrically connected via the gate line to the gate driver. The drain terminal of the thin-film transistor is electrically connected to the pixel electrode.

The correction capacitor has an end connected to the gate terminal of the thin-film transistor and an opposite end connected to the pixel electrode.

The correction capacitor is a voltage regulation capacitor having a capacitance that is smaller than a capacitance of the parasitic capacitor that is generated between the gate terminal and the drain terminal due structural characteristics thereof.

The correction capacitor has a rating voltage that is smaller than a rating voltage of the parasitic capacitor that is generated between the gate terminal and the drain terminal due structural characteristics thereof.

The correction capacitor has improved voltage resistance.

The drive circuit of liquid crystal panel further comprises a storage capacitor. The storage capacitor is connected in parallel to the liquid crystal capacitor.

The present invention also provides a drive circuit of liquid crystal panel, which comprises a gate driver, a source driver, a plurality of gate lines, and a plurality of data lines, the plurality of gate lines and data lines defining a plurality of pixel units, each of the pixel units comprising a thin-film transistor, a common electrode, a pixel electrode electrically connected to the thin-film transistor, and a correction capacitor, the thin-film transistor being electrically connected to the gate driver and the source driver respectively by means of the gate lines and the data lines, the common electrode and the pixel electrode constituting a liquid crystal capacitor, the thin-film transistor comprising a gate terminal and a drain terminal, the correction capacitor being electrically connected between the gate terminal and the drain terminal for correcting a parasitic capacitor generated between the gate terminal ad the drain terminal due to structural characteristics;

wherein the thin-film transistor comprises a source terminal, the source terminal being electrically connected via the data lines to the source driver;

wherein the gate terminal of the thin-film transistor is electrically connected via the gate line to the gate driver, the drain terminal of the thin-film transistor being electrically connected to the pixel electrode;

wherein, the correction capacitor has an end connected to the gate terminal of the thin-film transistor and an opposite end connected to the pixel electrode;

wherein the correction capacitor is a voltage regulation capacitor having a capacitance that is smaller than a capacitance of the parasitic capacitor that is generated between the gate terminal and the drain terminal due structural characteristics thereof;

wherein the correction capacitor has a rating voltage that is smaller than a rating voltage of the parasitic capacitor that is generated between the gate terminal and the drain terminal due structural characteristics thereof;

wherein the correction capacitor has improved voltage resistance; and further comprising a storage capacitor, the storage capacitor being connected in parallel to the liquid crystal capacitor.

The efficacy of the present invention is that the present invention provides a drive circuit of liquid crystal panel, which provides a correction capacitor between the gate terminal and the drain terminal of the thin-film transistor to constrain the voltage of a parasitic capacitor generated between the gate terminal and the drain terminal so as to reduce the extension of conduction time of the thin-film transistor caused by the discharging of the parasitic capacitor and thus reduce the possibility of abnormal conduction of the thin-film transistor in a non-conducted state thereby improving the accuracy of controlling the thin-film transistor, eliminating variation of transmittance and abnormal contrast caused by abnormal rotation of the liquid crystal molecules, and improving the quality of a large-sized liquid crystal display device using the circuit.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
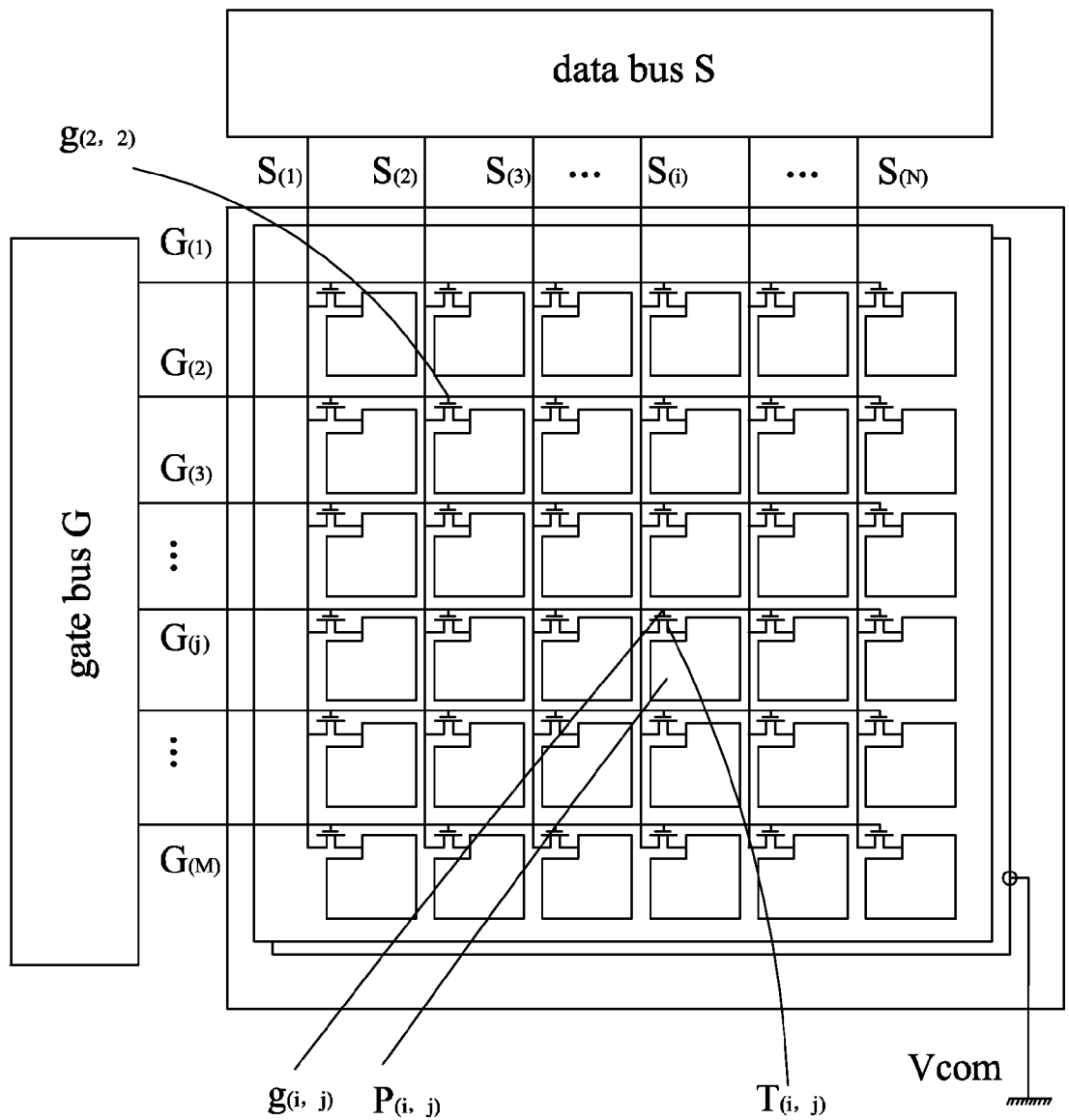
FIG. 1 is a schematic view showing the structure of a conventional drive circuit of TFT array substrate.
Figure 2:
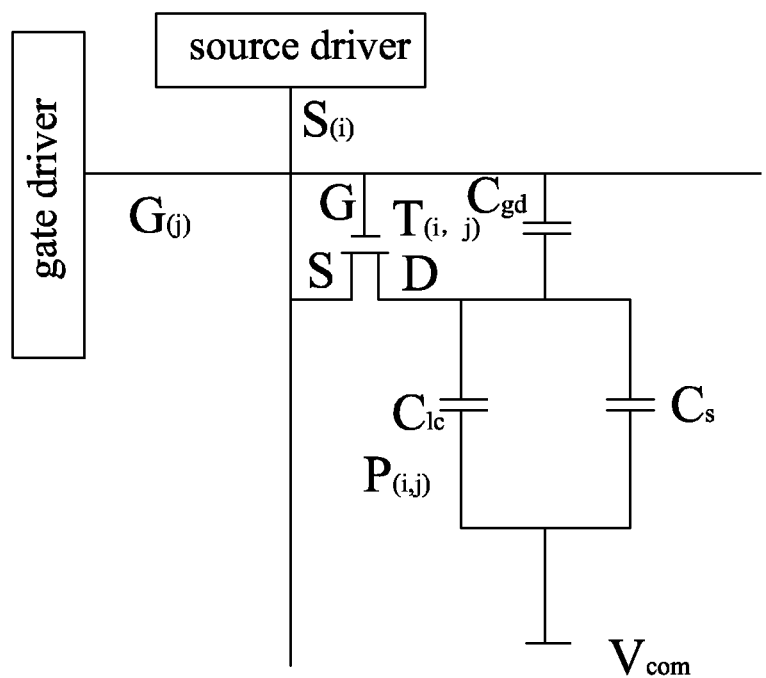
FIG. 2 is a schematic view showing connection of drive circuit of pixel electrodes of a conventional TFT substrate.
Figure 3:
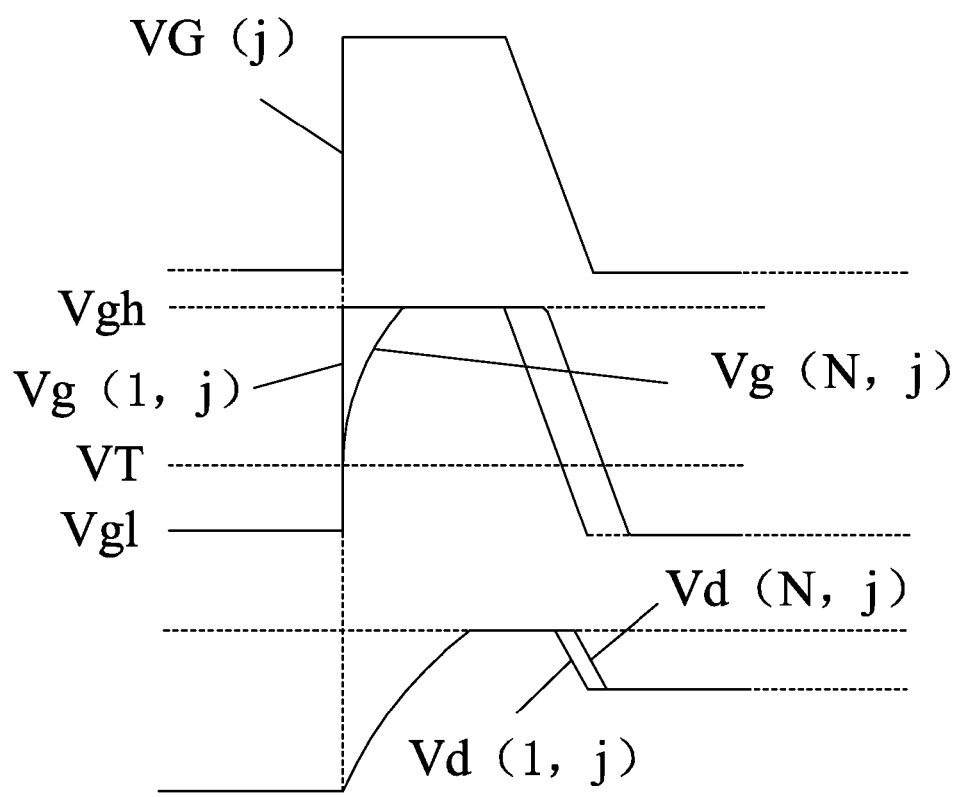
FIG. 3 is a schematic view showing waveform of drive voltage for the thin-film transistor shown in FIG. 1 in a conduction extension condition.
Figure 4:
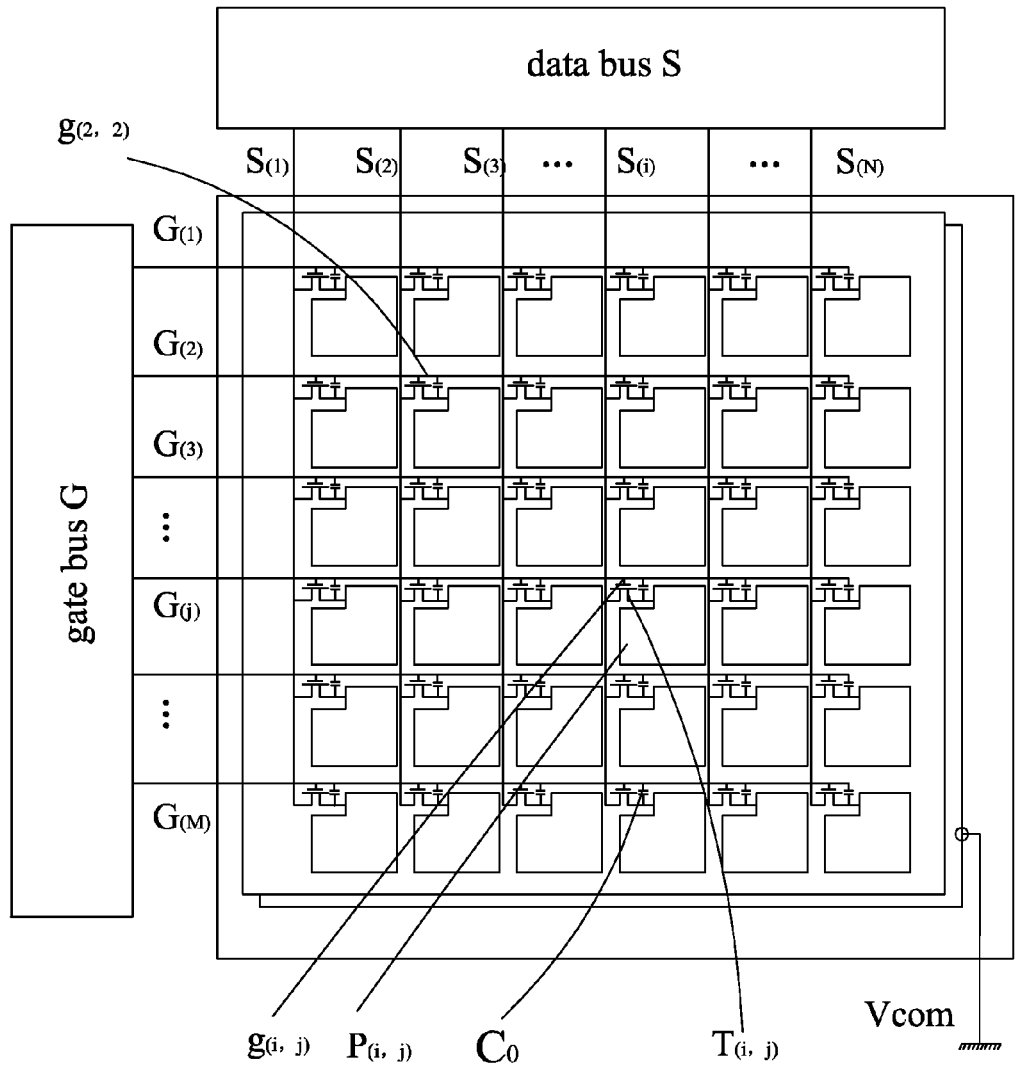
FIG. 4 is a schematic view showing the structure of a drive circuit of TFT array substrate according to the present invention.
Figure 5:
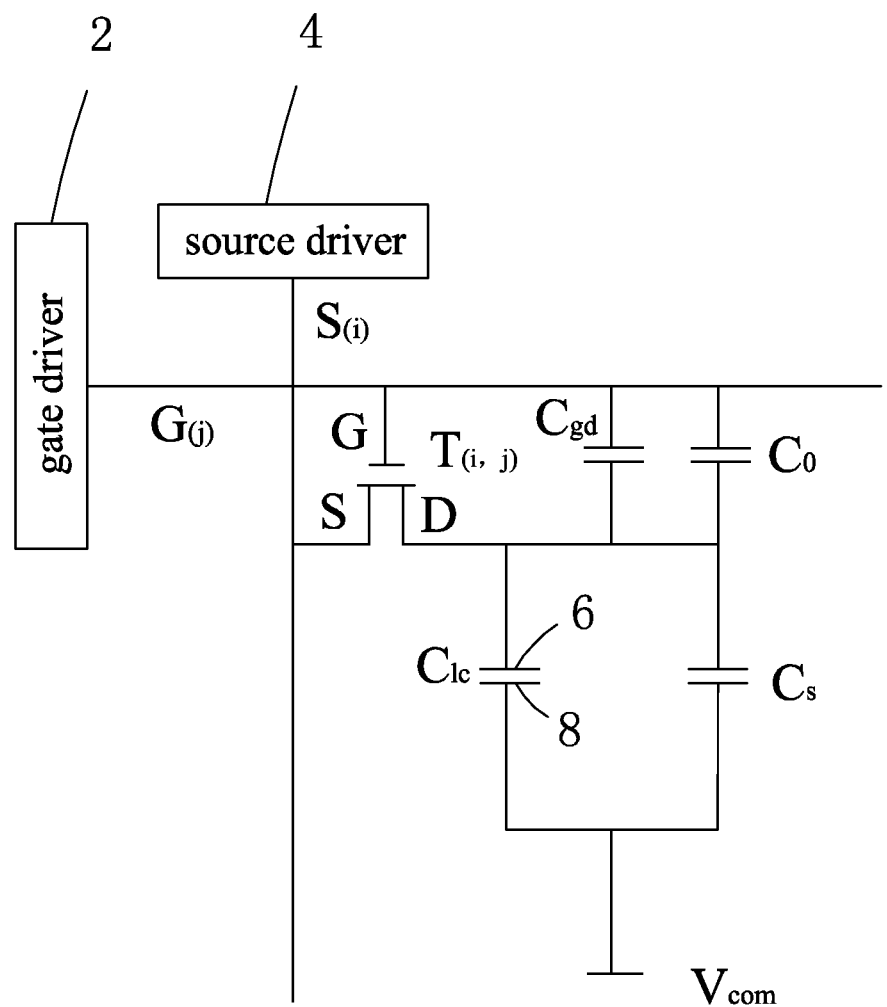
FIG. 5 is a schematic view showing circuit connection of pixel electrodes in a drive circuit of liquid crystal panel according to the present invention.
Figure 6:
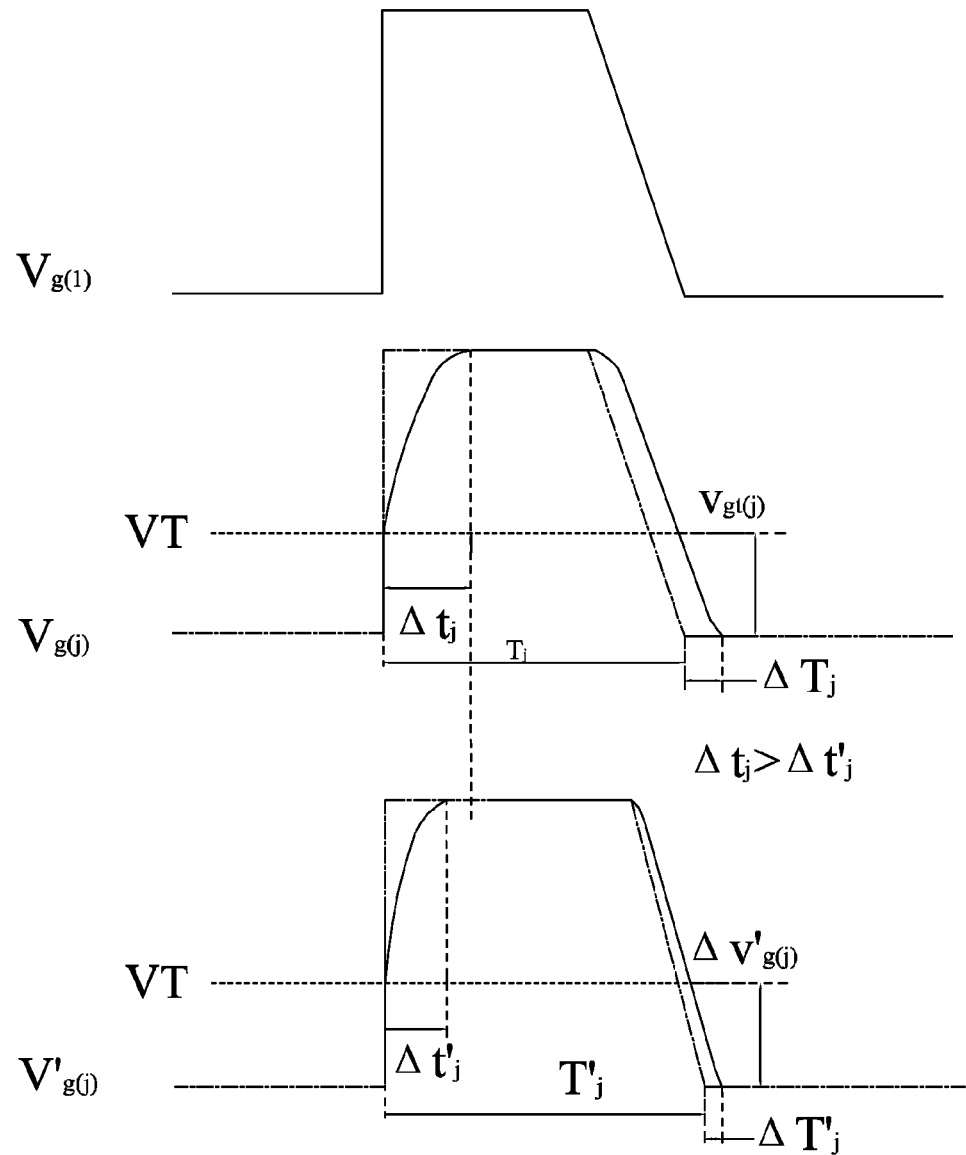
FIG. 6 is a schematic view showing waveform of drive voltage of a gate terminal of thin-film transistor provided by the drive circuit of liquid crystal panel according to the present invention.

Referring to FIGS. 4-6, the present invention provides a drive circuit of liquid crystal panel, which comprises a gate driver 2, a source driver 4, a plurality of gate lines G(j) and a plurality of data lines S(i). The plurality of gate lines G(j) and data lines S(i) define a plurality of pixel units. Each of the pixel units comprises a thin-film transistor T(i,j), a common electrode 8, a pixel electrode 6 electrically connected to the thin-film transistor T(i,j), and a correction capacitor $C_O$. The thin-film transistor T(i,j) is electrically connected to the gate driver 2 and the source driver 4 respectively by means of the gate lines G(j) and the data lines S(i). The common electrode 8 and the pixel electrode 6 constitute a liquid crystal capacitor $C_{lc}$. A storage capacitor $C_s$ is connected in parallel to the liquid crystal capacitor $C_{lc}$. The thin-film transistor T(i,j)

comprises a gate terminal G and a drain terminal D. The correction capacitor $C_0$ is electrically connected between the gate terminal G and the drain terminal D for correcting a parasitic capacitor $C_{gd}$ generated between the gate terminal G ad the drain terminal D due to structural characteristics.

The plurality of data lines S(1), S(2), . . . , and S(i) constitute a data bus structure S. The plurality of gate lines G(1), G(2), . . . , and G(j) constitute a gate bus structure G. The data bus structure S and the gate bus structure G collectively drive the pixel electrodes 6. Each of the data lines S(i) is connected to the source terminal S of one of the thin-film transistors T(i,j) to connect to each of the pixel electrodes 6. Each of the gate lines G(j) is connected to the gate terminal G of one of the thin-film transistors T(i,j) so as to connect to each of the pixel electrodes 6.

The thin-film transistor T(i,j) further comprises a source terminal S The source terminal S is electrically connected via the data line S(i) to the source driver 4.

The drive circuit of liquid crystal panel according to the present invention further comprises a storage capacitor Cs. The storage capacitor $C_s$ is connected to two ends of the liquid crystal capacitor $C_{ic}$ to effect voltage compensation for the liquid crystal capacitor $C_{ic}$.

The gate terminal G of the thin-film transistor T(i,j) is electrically connected via the gate line G(j) to the gate driver 2. The drain terminal D of the thin-film transistor T(i,j) is electrically connected to the pixel electrode 6. The correction capacitor $C_0$ has an end connected to the gate terminal G of the thin-film transistor T(i,j) and an opposite end connected to the pixel electrode 6.

The correction capacitor $C_0$ is a voltage regulation capacitor having a capacitance and a rating voltage that are respectively smaller than a capacitance and a rating voltage of the parasitic capacitor $C_{gd}$ that is generated between the gate terminal G and the drain terminal D due structural characteristics thereof. The correction capacitor $C_o$ has improved voltage resistance.

Since the correction capacitor $C_0$ is a voltage regulation capacitor having a capacitance that is smaller than the parasitic capacitor $C_{gd}$ generated between the gate terminal G and the drain terminal D of the thin-film transistor T(i,j), when the gate voltage $V_g$(i,j) gets greater than the conduction voltage VT of the thin-film transistor T(i,j), charging is effected by a rising edge of the gate voltage Vg(i,j) via the correction capacitor $C_0$, the liquid crystal capacitor $C_{ic}$, the storage capacitor $C_s$, and the parasitic capacitor $C_{gd}$ to achieve charging saturation and reverse discharging is effected by a falling edge of the gate voltage $V_g$(i,j), via the storage capacitor $C_s$ and the parasitic capacitor $C_{gd}$ to achieve linear voltage dropping. During the process of charging the storage capacitor $C_s$ and the parasitic capacitor $C_{gd}$, the correction capacitor $C_0$ gets saturated earlier than the parasitic capacitor $C_{gd}$ and shows a voltage $V_{C0}$, $V_{C0}$ being smaller than a voltage $V_{Cgd}$ that makes the parasitic capacitor $C_{gd}$ saturated. Further, since the parasitic capacitor $C_{gd}$ and the correction capacitor $C_0$ are of a parallel connection arrangement, the actual voltage $V'_{Cgd}$ of the parasitic capacitor $C_{gd}$ is substantially equal to the voltage $V_{C0}$ of the correction capacitor $C_0$. When the falling edge of the gate voltage $V_g$(i,j) causing reverse discharging via the storage capacitor $C_s$ and the parasitic capacitor $C_{gd}$, similar to the forward-directing situation, the discharging time is reduced and the amplitude of the feedback voltage of reverse discharging is smaller, making the time delaying shorter, namely $\Delta T'_j < \Delta T_j$. It can be observed from the waveform of drive voltage of the gate terminal in FIG. 5 that the gate voltage $V'_{g(j)}$, when staying in a state of being greater than a threshold voltage VT of the gate terminal G, shows a variation of unit time less than the variation of dropping of the gate voltage $V_{g(j)}$ in unit time with no correction capacitor $C_0$ included. In other words, the thin-film transistor T(i,j) that is supposed to cut off is not likely to be affected by the parasitic capacitor $C_{gd}$ to get conducted on.

In summary, the present invention provides a drive circuit of liquid crystal panel, which provides a correction capacitor between the gate terminal and the drain terminal of the thin-film transistor to constrain the voltage of a parasitic capacitor generated between the gate terminal and the drain terminal so as to reduce the extension of conduction time of the thin-film transistor caused by the discharging of the parasitic capacitor and thus reduce the possibility of abnormal conduction of the thin-film transistor in a non-conducted state thereby improving the accuracy of controlling the thin-film transistor, eliminating variation of transmittance and abnormal contrast caused by abnormal rotation of the liquid crystal molecules, and improving the quality of a large-sized liquid crystal display device using the circuit.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A drive circuit of liquid crystal panel, comprising a gate driver, a source driver, a plurality of gate lines, and a plurality of data lines, the plurality of gate lines and data lines defining a plurality of pixel units, each of the pixel units comprising a thin-film transistor, a common electrode, a pixel electrode electrically connected to the thin-film transistor, and a correction capacitor, the thin-film transistor being electrically connected to the gate driver and the source driver respectively by means of the gate lines and the data lines, the common electrode and the pixel electrode constituting a liquid crystal capacitor, the thin-film transistor comprising a gate terminal and a drain terminal, the correction capacitor being electrically connected between the gate terminal and the drain terminal for correcting a parasitic capacitor generated between the gate terminal and the drain terminal due to structural characteristics;

wherein the correction capacitor is a voltage regulation capacitor having a capacitance that is smaller than a capacitance of the parasitic capacitor that is generated between the gate terminal and the drain terminal due to structural characteristics thereof and connected in parallel with the correction capacitor, and thereby the correction capacitor gets saturated earlier than the parasitic capacitor during charging effected by a rising edge of a gate voltage supplied to the gate terminal and the parasitic capacitor is constrained to be non-saturated;

wherein the correction capacitor has a rating voltage that is smaller than a rating voltage of the parasitic capacitor that is generated between the gate terminal and the drain terminal due to structural characteristics thereof.

2. The drive circuit of liquid crystal panel as claimed in claim 1, wherein the thin-film transistor comprises a source terminal, the source terminal being electrically connected via the data lines to the source driver.

3. The drive circuit of liquid crystal panel as claimed in claim 2, wherein the gate terminal of the thin-film transistor is electrically connected via the gate line to the gate driver, the drain terminal of the thin-film transistor being electrically connected to the pixel electrode.

4. The drive circuit of liquid crystal panel as claimed in claim 3, wherein, the correction capacitor has an end connected to the gate terminal of the thin-film transistor and an opposite end connected to the pixel electrode.

5. The drive circuit of liquid crystal panel as claimed in claim 1, wherein the correction capacitor has improved voltage resistance.

6. The drive circuit of liquid crystal panel as claimed in claim 1 further comprising a storage capacitor, the storage capacitor being connected in parallel to the liquid crystal capacitor.

7. A drive circuit of liquid crystal panel, comprising a gate driver, a source driver, a plurality of gate lines, and a plurality of data lines, the plurality of gate lines and data lines defining a plurality of pixel units, each of the pixel units comprising a thin-film transistor, a common electrode, a pixel electrode electrically connected to the thin-film transistor, and a correction capacitor, the thin-film transistor being electrically connected to the gate driver and the source driver respectively by means of the gate lines and the data lines, the common electrode and the pixel electrode constituting a liquid crystal capacitor, the thin-film transistor comprising a gate terminal and a drain terminal, the correction capacitor being electrically connected between the gate terminal and the drain terminal for correcting a parasitic capacitor generated between the gate terminal and the drain terminal due to structural characteristics;

wherein the thin-film transistor comprises a source terminal, the source terminal being electrically connected via the data lines to the source driver;

wherein the gate terminal of the thin-film transistor is electrically connected via the gate line to the gate driver, the drain terminal of the thin-film transistor being electrically connected to the pixel electrode;

wherein, the correction capacitor has an end connected to the gate terminal of the thin-film transistor and an opposite end connected to the pixel electrode;

wherein the correction capacitor is a voltage regulation capacitor having a capacitance that is smaller than a capacitance of the parasitic capacitor that is generated between the gate terminal and the drain terminal due to structural characteristics thereof and connected in parallel with the correction capacitor, and thereby the correction capacitor gets saturated earlier than the parasitic capacitor during charging effected by a rising edge of a gate voltage supplied to the gate terminal and the parasitic capacitor is constrained to be non-saturated;

wherein the correction capacitor has a rating voltage that is smaller than a rating voltage of the parasitic capacitor that is generated between the gate terminal and the drain terminal due structural characteristics thereof;

wherein the correction capacitor has improved voltage resistance; and further comprising a storage capacitor, the storage capacitor being connected in parallel to the liquid crystal capacitor.

* * * * *